INVENTOR
CHARLES A.L. RUHL
John W. Haines
ATTORNEY

INVENTOR
CHARLES A.L. RUHL
John W. Gaines
ATTORNEY

INVENTOR
CHARLES A.L. RUHL
John W. Gaines
ATTORNEY

INVENTOR
CHARLES A. L. RUHL
John W. Haines
ATTORNEY

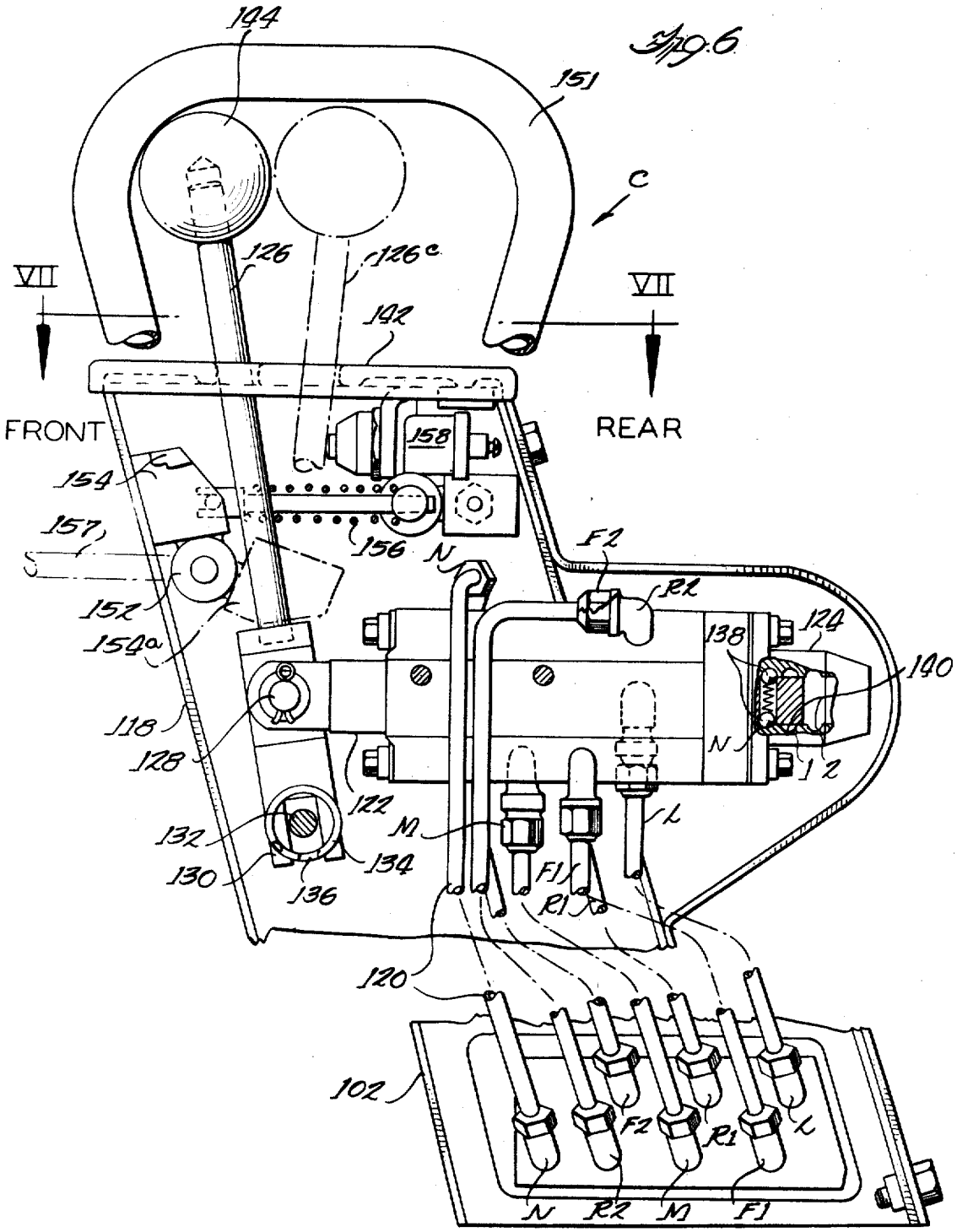
INVENTOR
CHARLES A.L. RUHL
John W. Gaines
ATTORNEY

CHARLES A.L. RUHL
John W. Haines
ATTORNEY

United States Patent Office

Re. 28,039
Reissued June 11, 1974

28,039
FORWARD-REVERSE, STEERING, BRAKING AND MOTOR CONTROL

Charles A. L. Ruhl, Wheaton, Ill., assignor to International Harvester Company, Chicago, Ill.

Original No. 3,386,523, dated June 4, 1968, Ser. No. 507,010, Nov. 9, 1965. Application for reissue Jan. 18, 1971, Ser. No. 107,538, which is a continuation of abandoned reissue application Ser. No. 868,249, Oct. 8, 1969

Int. Cl. B60k *29/00;* F16d *67/04*
U.S. Cl. 180—6.66 27 Claims

Matter enclosed in heavy brackets [ ] appears in the original patent but forms no part of this reissue specification; matter printed in italics indicates the additions made by reissue.

ABSTRACT OF THE DISCLOSURE

Forward-reverse drive control for a tractor having plural actuators for steering and for reversing the direction of motion of the tractor. The tractor is provided with a conventional engine, and an engine-driven power train comprising directional clutch packs, steering disks on one side including, e.g., a left drive disk and a left pivot disk, and similar steering disks on the other (right) side. A steering linkage is provided to release one drive disk upon actuation of one actuator and to apply the companion pivot disk upon further actuation of the one actuator, a similar linkage is provided between the other disks and another actuator, operator's brake means is provided operable upon actuation of the third actuator (foot brake) to apply both pivot brakes only, automatic brake means is provided, operable upon actuation of the fourth actuator (directional clutch selector actuator) as it passes through neutral, to neutralize the clutch packs and to apply both pivot brakes and to decelerate the engine, and a delay means, of a type effective after a delay period, is provided to reversely engage the clutch pack and release the pivot brakes and reaccelerate the engine.

*The present re-issue application is a continuation of the parent re-issue application Ser. No. 868,249 filed Oct. 8, 1969 and now abandoned.*

This invention relates to augmenting means for use in conjunction with a vehicle transmission which is operated by a forward-reverse drive control so that, when being reversed, the transmission neutralizes without delay and goes into the opposite or reverse drive setting after a set delay. It particularly relates to such means employed on the vehicle and providing for both automatic engagement of the brakes and automatic idling of the engine upon disengagement or neutralizing of the transmission, as well as providing for automatic release of the brakes and restoration of the engine to a speed above regular idling when the transmission re-engages.

Thus a transmission, both on its input side and on its output side, is conditioned by my invention so that when the reverse shift is completed, the takeover shock encountered by the reverse power path therethrough is materially reduced or substantially eliminated. While the invention is primarily applicable to loaders and industrial construction and agricultural tractors, it has equal application to trucks and other vehicles equipped with a transmission drive, particularly a power-shift transmission.

By reverse, as used herein in a less encompassing sense, is meant only that condition of the transmission for driving to the rear, whereas reverse, as used in the encompassing sense of a reverse shift above, means a change either from rear drive to drive in the forward direction, or vice versa. Similarly, reversing the power path is an expression meaning changing from rear drive to forward drive, or vice versa.

Shuttle work to and fro constitutes such a major part of the utility of industrial construction, agricultural, loader, and like vehicles, that a suitable power shift transmission is desirable to expedite the speed changes and direction changes that are a frequent necessity to the operator. Problems arise when shuttling many such vehicles because reverse shifting is tedious and time consuming, and very often puts the transmission under undue strain due to shock loading of the reverse power path in effecting the change of direction.

My invention alleviates the foregoing problems. It especially alleviates the situation arising by the combination of the two wherein a forced reverse shift takes place in the power shift transmission in such a short interval, and without conditioning the operating components of the vehicle, that the strain is excessive, as will now be explained. Features, objects, and advantages will either be specifically pointed out or become apparent when, for a better understanding of the invention, reference is made to the following description taken in conjunction with the accompanying drawings, which show a preferred embodiment thereof and in which:

FIGURE 6 is a side elevational view of a detail of the tractor of FIGURE 1, but viewed from the opposite side;

Figure 1:
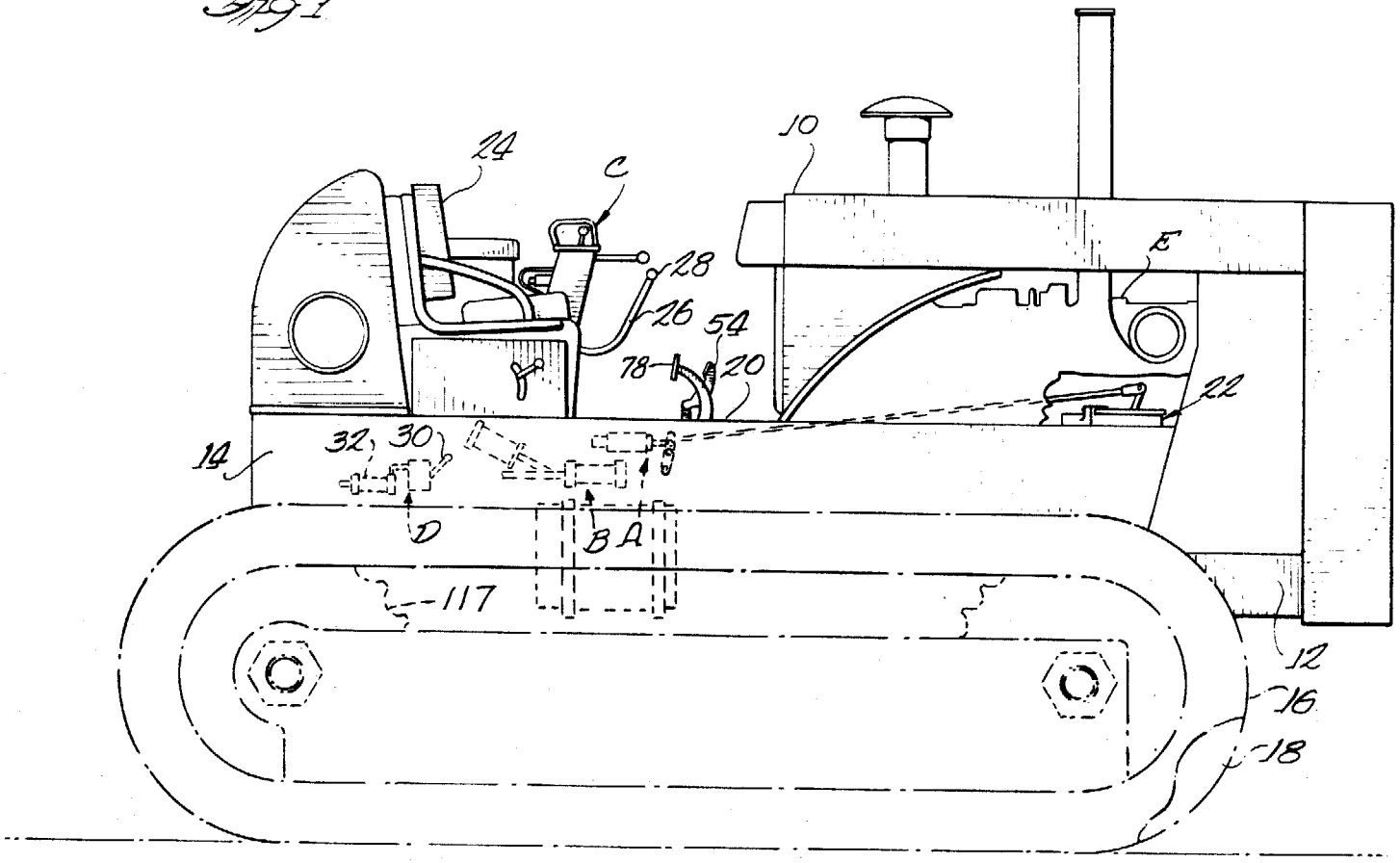
FIGURES 1 and 2 are right side, elevational views to small scale and large scale respectively, of a tractor embodying the present invention.

More particularly in FIGURE 1 of the patent drawings, the vehicle 10 of the present illustrative example is a crawler tractor from which a conventional blade, cutter, loader bucket, or other material handling equipment is omitted for simplification. A longitudinally extending tractor frame 12 carries a body 14 and is carried by left and right longitudinal tracks 16 and 18 disposed one on each lateral side of the frame 12. The vehicle 10 proceeds in a straight line so long as the tracks 16 and 18 are driven at the same speed and the vehicle is steered by causing the tracks to rotate at different speeds.

An automatic decelerator control A, which is mounted beneath the floor plates 20 of the tractor body 14, forms part of the fuel system 22 which in the main is located forwardly and on the left side of the engine E of the tractor.

An automatic brake control B forms part of the braking system.

A range valve control C, which is adjacent an operator's seat assembly 24, forms part of the power shift transmission system.

A planetary steering control D includes right and left steering levers 26 and 28 which are slightly forward of the seat assembly 24 and which are operated by hand so as to swing in longitudinal vertical planes. Each steering lever has a separate connection, not shown, to a valve operating lever or arm 30, and not only controls the braking system referred to, but also by operating the arm 30 causes hydraulic cylinder means generally indicated at 32 to engage suitable drive brake disks in the planetary steering system, not shown. In that way, both tracks or either track can be operated in high range or low range drive, or stopped by braking with a so-called pivot braking action so that the vehicle pivots about that track.

AUTOMATIC DECELERATOR CONTROL (FIGURES 2, 3 AND 4)

Figure 2:
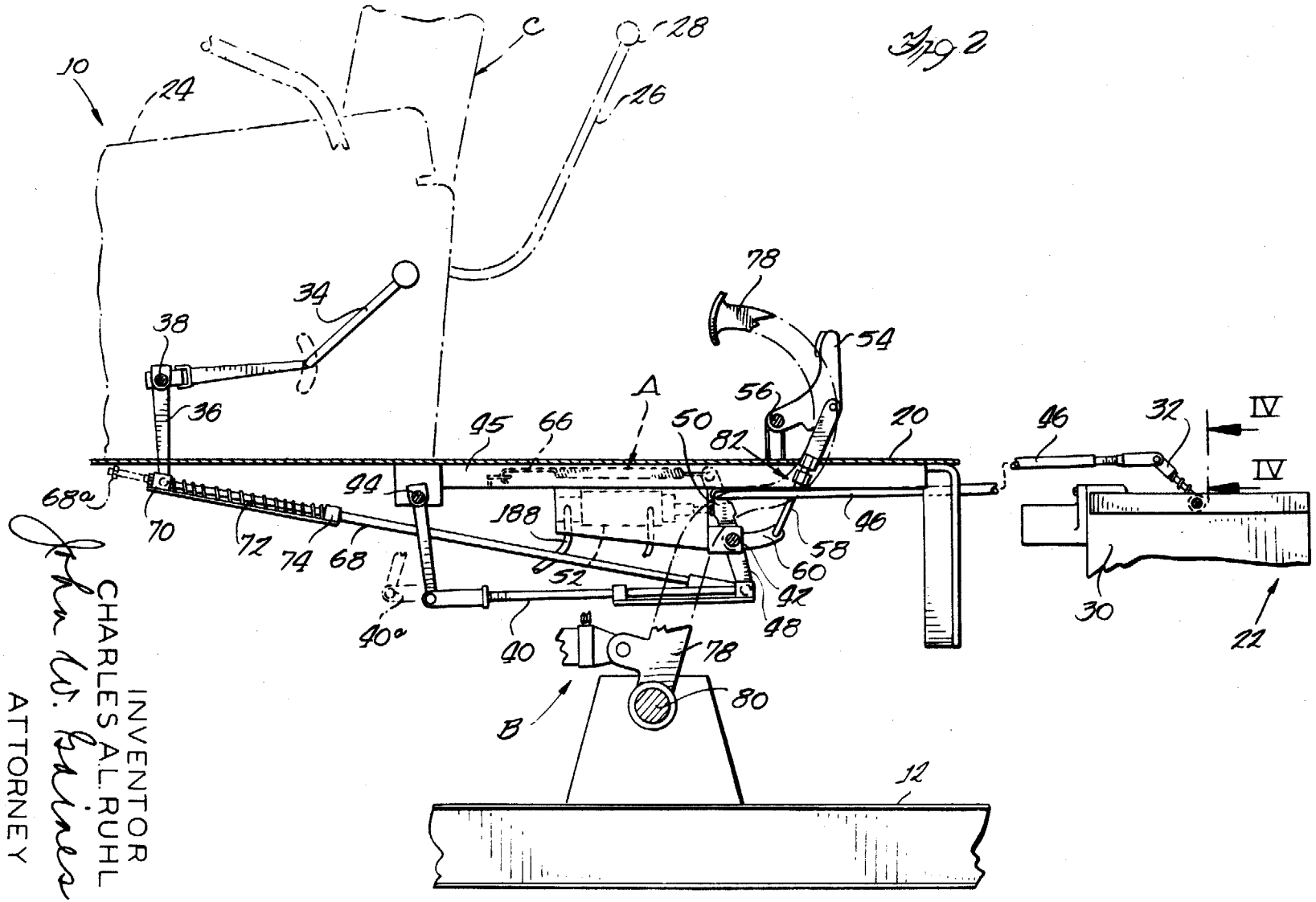

A rotary distributor, [ffuel] *fuel* injection pump 30 is the central component of the fuel system 22 and pivotally carries thereon an upstanding control lever 32. An engine speed control handle 34, which is pivotally mounted at the side of the operator's seat assembly 34, operates the pump control lever 32 and is connected thereto by a crank 36 depending from a fixed pivot 38, by a parallelogram linkage 40 depending from a fixed front link pivot 42 and from a fixed rear pivot 44, and by a long, fore-and-aft extending rod 46 which is pivoted to the top of the control lever 32. Upward movement of the handle 34 as viewed in FIGURE 2 causes rearward movement of the control lever 32 into a full power setting as shown in FIGURE 2 in solid lines.

The pivots 42 and 44 are fixed in brackets generally indicated at 45 and made fast to the underside of the floor plates 20. The fixed front link pivot 42 passes through the front link intermediate its ends, dividing the latter into a front link lower arm 48 and a front link upper arm 50. The front link upper arm 50 has a pivotal connection to the rod 46 and has an abutment connection to a normally foreshortened, decelerator cylinder 52. The cylinder 52 ordinarily does not interfere with the parallelogram linkage 40 when in the full power condition although, when the cylinder 52 is extended, it rocks the front link from the full power setting shown in FIGURES 2 and 4, into the enforced idling setting shown in FIGURES 1 and 3.

Deceleration is accomplished by other means. A decelerator pedal 54 is secured on a fixed pivot 56 at a point slightly above the floor plates 20. A compression link 58 connects the pedal 54 and the horizontal leg 60 of a bell crank. The bell crank rotates when the decelerator pedal 54 rotates and in the same direction, and a vertical arm 62 of the bell crank (FIGURE 4) engages a lateral lug 64 rigid with the front link upper arm 50 to cause the front link to advance from the full power setting shown in FIGURE 4 to the idle setting illustrated in FIGURE 8. A tension spring 66 connected between a bracket carried by the floor plates 20 and the vertical arm 62 of the bell crank biases the bell crank and the decelerator pedal 54 into their unpivoted position.

A diagonally disposed rod 68 has a pivotal connection at the front end to the front link lower arm 48 and is slidably received at rear end in a bored block 70 pivotally carried by the depending crank 36. A collapsible compression spring 72 acting between the block 70 and a block 74 fixed to the rod 68 allows the linkage 40 to accommodate to deceleration movement and to be restored therefrom, all with a lost motion action without disturbing the setting of the speed control handle 34. That is to say, the rod slides in the block to the broken line position 68a against the resistance of the spring 72 as the parallelogram linkage moves into the broken line deceleration position 40a, and when the deflecting force is removed the spring 72 expands, forcing the rod 68 and the parallelogram linkage 40 into their full power positions shown by solid lines in FIGURE 2.

Figure 4:
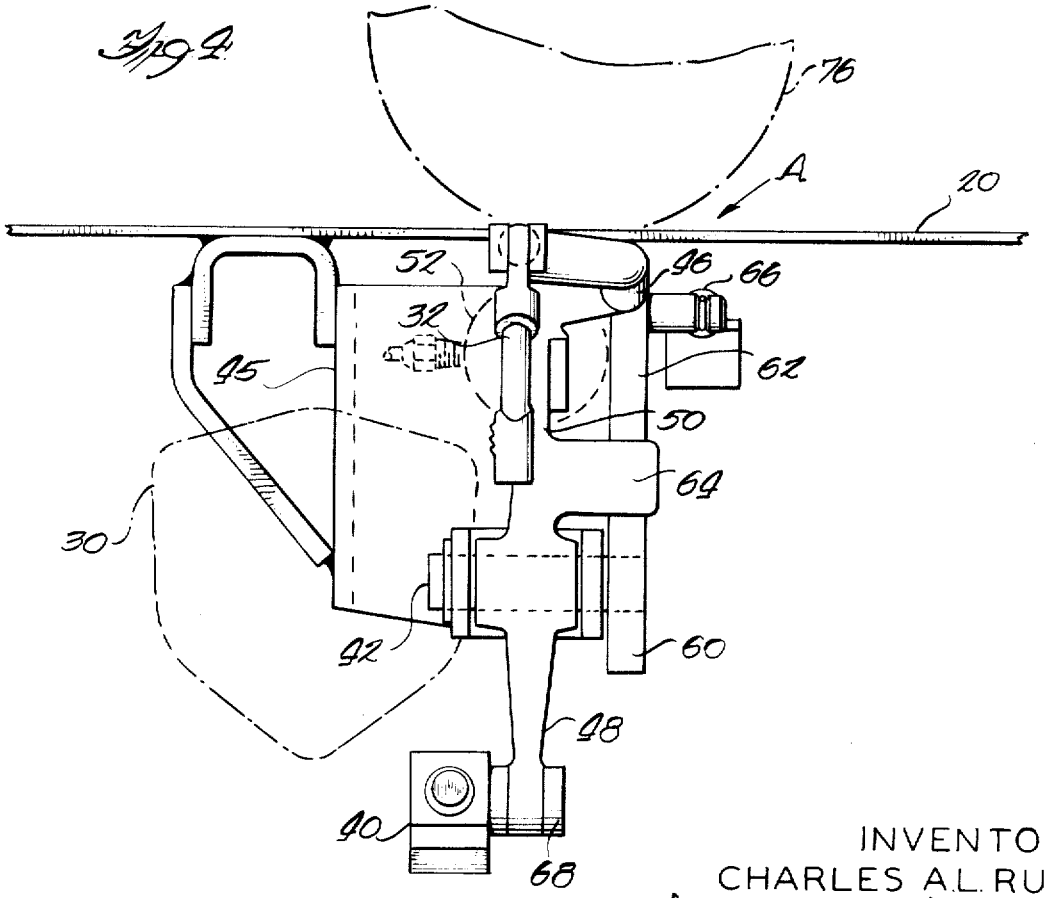
FIGURE 4 is a front elevational view, to large scale, looking in the direction of the rearwardly directed arrows IV—IV in FIGURE 2.

The outlines of the injection pump and generator on the engine are indicated by the broken lines 30 and 76, respectively, in FIGURE 4.

BRAKING

Pedal (FIGURE 2)

The vehicle 10 has a single brake pedal 78 which protrudes at its upper end through a slot in the floor plates 20 and which pivots at its lower end on a fixed pivot 80 carried on an upstanding bracket supported by the frame 12. A return spring, not shown, biases the pedal 78 into its unpivoted, abutting position against a stop 82 which is carried by the floor plates 20 and which provides a reaction point for the brake pedal when the automatic brake control B is operated.

Figure 3:
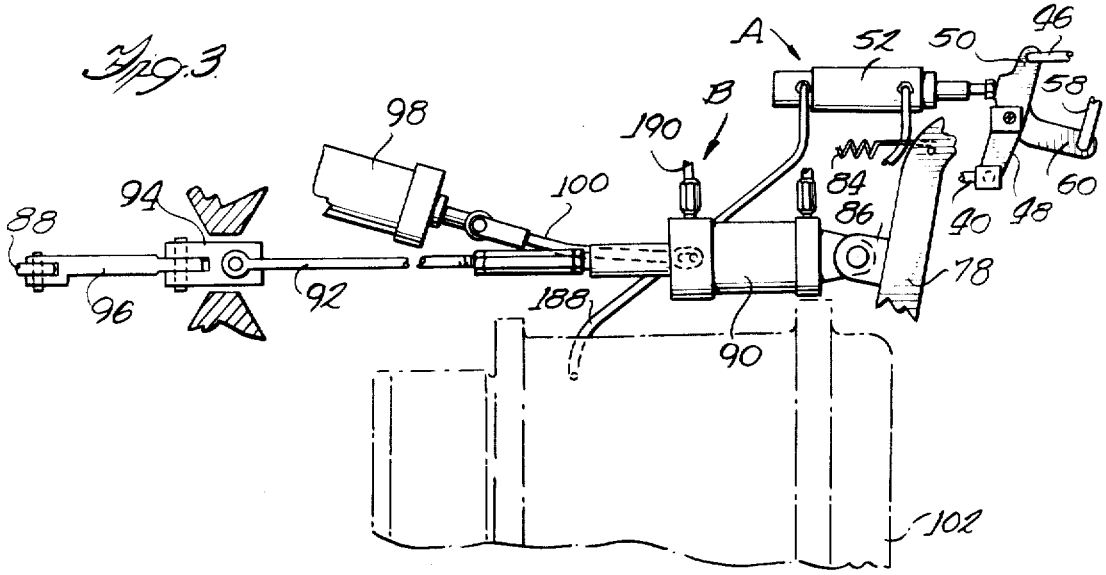
FIGURE 3 is a view similar to FIGURE 2, but with some foreground parts omitted and others added, respectively.

Automatic control (FIGURE 3)

The brake return spring just referred to is shown at 84 connected to an intermediate point on the brake pedal 78. A pivot-carrying lug 86 therebelow on the pedal 78 connects the pedal to a brake applying arm 88 by means of a linkwork including, from front to rear, a normally extended, automatic brake control cylinder 90, a pull rod 92, a motion transmitting cross head 94, and a link 96 pivotally connected to the arm 88. An extensible, brake booster cylinder 98 has a connecting rod connection 100 to the cylinder 90. The booster cylinder 98 is motion sensitive to forward movement of the pedal 78 from its unpivoted position, so as to afford a power assist to the pedal in exerting tension in the pull rod 92 and applying the brakes. The transmission in the vehicle is hydraulically operated and is indicated by the broken outlines 102.

Figure 5:
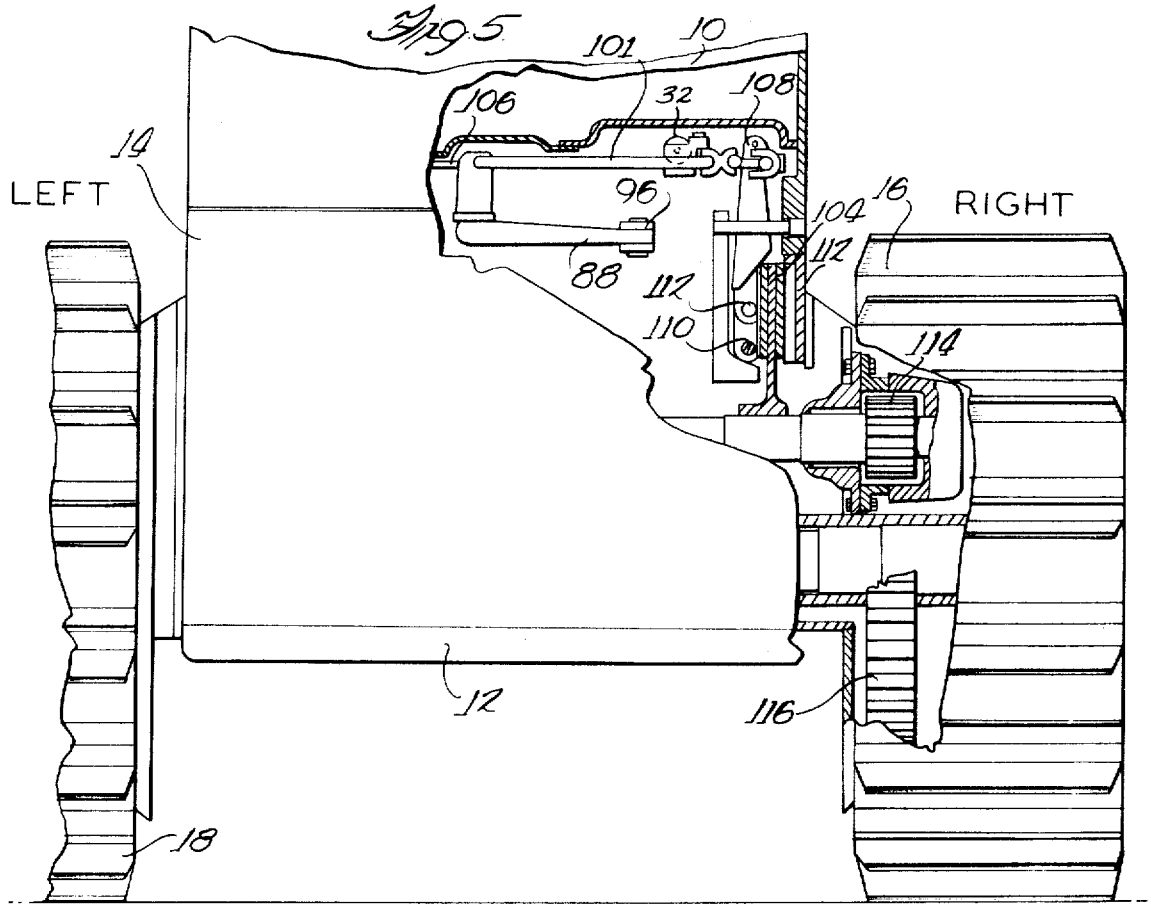
FIGURE 5 is a rear end, elevational view of the tractor of FIGURE 1.

Disk (FIGURE 5)

The brake applying arm 88 referred to operates by means of an outwardly moving, push rod connection 101 to apply a caliper brake against a so-called pivot brake disk 104 in the right final drive to the track 16. Similarly, the arm 88 operates by means of another outwardly moving, push rod 106 to apply a caliper brake against a brake disk, not shown, connected in the left final drive to the track 18. The linkages on both sides are the same, and operate the two brake disks simultaneously.

More specifically, the push rod 101 connection pushes outwardly against the upper end 108 of a caliper lever which is pivoted at its lower end on a fixed pivot 110. A shoe, not shown, which is carried by a pivot 112 on the caliper lever is forced against the brake disk 104 and the reaction is taken by the main case 112 of the final drive.

The brakes can be independently applied by other means. Each steering lever, not shown, can be retracted into a braking position so that the pivot brake disk in either the right final drive or the left final drive, or both, can be applied by power.

Each brake disk, of which only the disk 104 is shown, is made fast to the same final drive shaft with a pinion 114 which meshes with a bull gear 116. Depending upon the gear reduction desired, the bull gear 116 at each side of the tractor can directly drive the track sprocket 117 (FIGURE 1) at the side or can be connected thereto by reduction planetary gearing, not shown.

RANGE VALVE CONTROL (FIGURES 6 AND 7)

The range valve control C is carried in an upstanding control tower 118 which is to the left of the seat assembly of the operator, and the control C is connected by vertically disposed hydraulic piping 120 to the vehicle transmission 102. The range valve control includes a remote valve 122 slidably mounted for rotation and for reciprocation in a remote valve housing 124. At the forward end, the valve 122 carries a transmission range valve lever 126 by means of a pivot 128 passing through an intermediate portion of the lever.

As the valve 122 rotates, the lever 126 tilts therewith about the valve axis so as to occupy one of three radial planes which intersect the axis of the valve 122. When disposed in any of the three planes, the lever 126 pivots therein on its slotted lower end 130 about a fixed horizontal rod 132 engaged in the slot. The vertical plane through the valve axis is the central reference plane among the three planes, and two opposing compression springs 134 and 136 engage the slotted lower end 130 of the valve lever 126 and reach a balanced position when they have moved the lever 126 into the central reference plane.

The remote valve 122, in a transverse bore formed at the rear end, carries a pair of ball detents 138 which are spring biased in opposite outward directions to seat the balls in any one of three coaxial annular detent grooves 140 in the housing 124 so as to oppose sliding of the valve 122 from its reciprocatory positions therein. The springs 134 and 136 which trap the lever 126 therebetween oppose turning of the valve 122.

Figure 7:
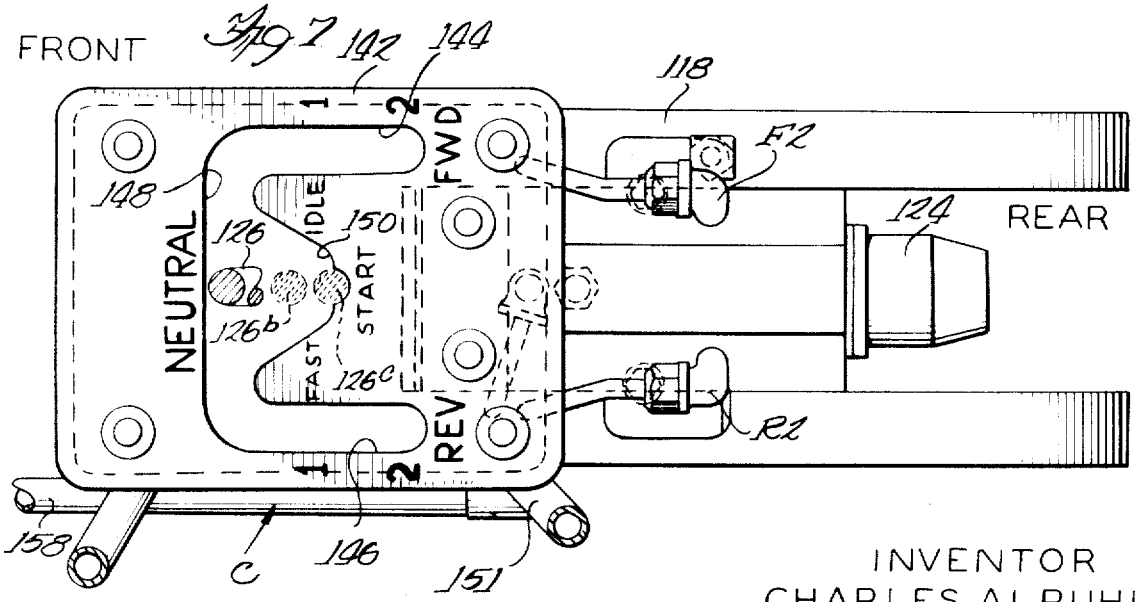
FIGURE 7 is a top plan view of the detail of FIGURE 6 shown along the lines VII—VII thereon.

The valve lever 126 projects upwardly through a slotted gate plate 142 on the tower 118 and carries a hand knob 144 at the upsanding end. The plate 142 guides movement of the lever 126 and includes longitudinal inner and outer slots 144 and 146, and a transverse gate portion 148 connecting the two slots. The valve lever 126 takes the solid line position as shown in FIGURE 7 when the remote valve is in a neutral (N) setting and takes a fast idle position shown by the broken lines 126b when the valve is in a fast idle (FI) setting. The lever 126 can take the broken line, start position 126c located in a perpendicularly relieved portion 150 of the gate, by being caused to overtravel slightly rearwardly from the fast idle position.

In transferring among the positions just described, the lever 126 is simply pivoting in its radial central reference plane. The longitudinal inner and outer slots 144 and 146 coincide with the other two radial planes in which the lever 126 is pivoted.

The valve lever 126 has two positions in the inner slot 144, moving the valve 122 into a low range forward setting (F1) when the lever 126 transversely aligns with a marking 1 beside the slot, and moving the valve into a high range forward setting (F2) when the lever 126 aligns with a marking 2. Similarly, the lever 126 has positions in the outer slot 146 so as to transversely align with markings 1 or 2, respectively, thus moving the remote valve 122 into a corresponding low range reverse setting (R1) or a high range reverse setting (R2).

The tower 118 carries, at the top on its outer side, a short upstanding handrail 151.

A releasable lock 152 can be operated to hold the valve lever 126 in its central reference plane. At that time, a pair of closely spaced apart plates 154 is rotated into the broken line position 154a in which the plates straddle the lever 126. An overcenter spring mechanism generally indicated at 156 restrains the lock 152 in both the locked and unlocked positions, and the lock is controlled by an external hand lever 157 which is pivotally mounted on the outside of the tower 118.

As indicated, the start position of the lever 126 is shown by the broken lines 126c in FIGURES 6 and 7. The valve 122 remains essentially in the fast idle setting (detents 138 locked in the center, or position 1, among the grooves 138), whereas a starter switch 158 is closed due to engagement by the lever so as to crank the engine of the vehicle. Release of the lever from the start position to fast idle disconnects the starter and allows the engine to run at a speed corresponding to the position of the speed control handle 34 (FIGURE 2).

CONTROL CIRCUIT (FIGURE 8)

The circuit includes a set 120 of seven oil lines having the abbreviated functional designations M, L, N, F1, F2, R1, and R2 and interconnecting the remote valve housing 124 and three transmission valves F2F1, R1R2, and N0 present in the transmission 102 and known collectively as the range selector valving. The circuit further includes service lines 160, 162, 164, and 166 interconnecting the three transmission valves and the actuating cylinders in a forward drive clutch pack 168 and in a rear drive clutch pack 170.

A regulator 172 connected in the output of a main pump 174 comprises main, intermediate, and lube oil pressure valves which coact to provide intermediate and main pressure at the respective points I and M on the downstream and upstream sides of the main pressure valve, also lube pressure and intermediate pressure at the points L and I on the downstream and upstream sides of the intermediate valve, and finally drain and lube oil pressure at the respective points D downstream and L upstream of the lube oil pressure valve. A scavenging pump 176 has an oil line 178 interconnecting the output thereof and an oil sump 180 in the circuit which supplies the main pump 174.

Figure 8:
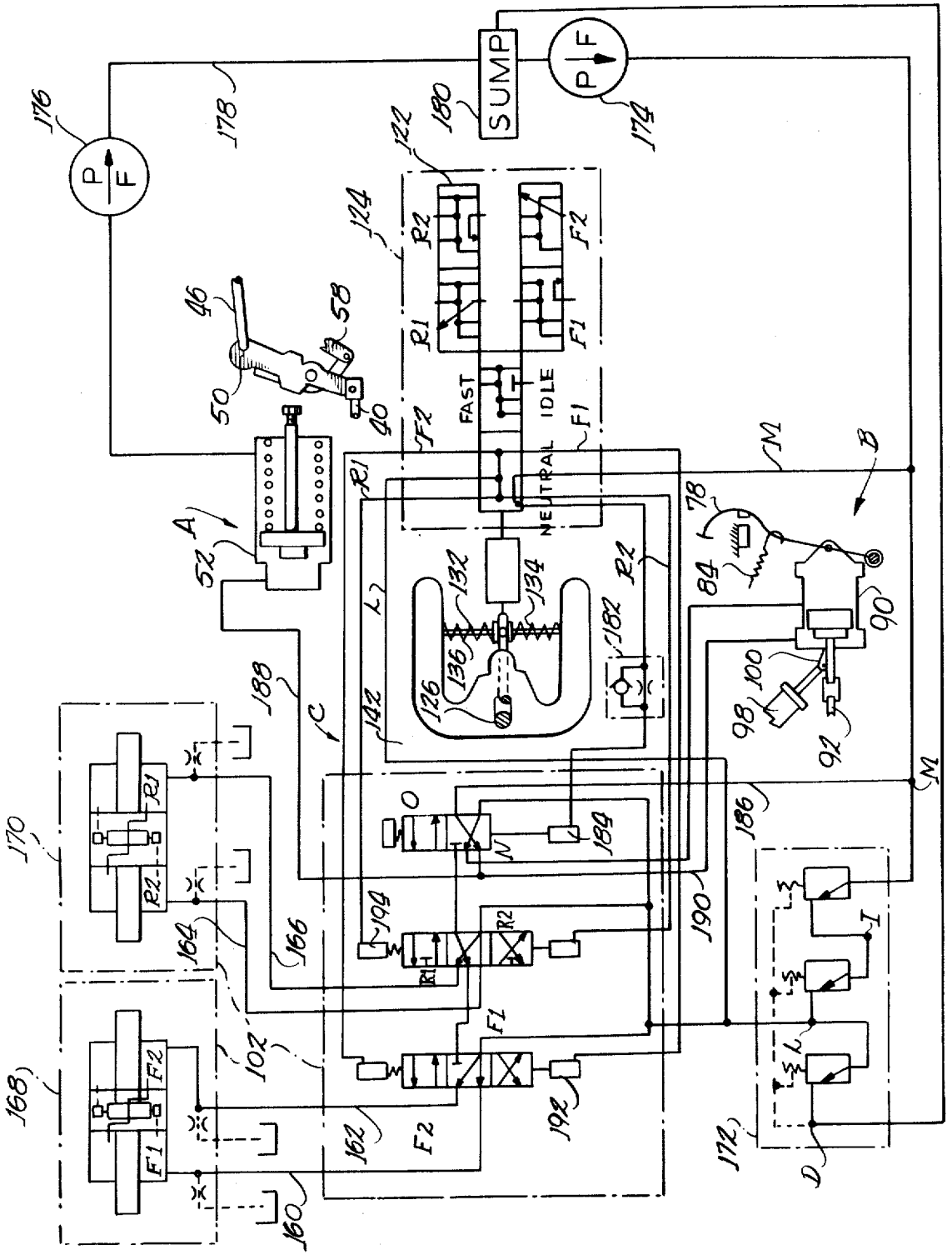
FIGURE 8 is a one line, hydraulic diagram of the tractor control circuit.

Standard hydraulic schematic symbols are used in FIGURE 8 to illustrate the components. The actual internal valve and clutch construction can be readily devised from the symbols by one skilled in the art, and so they are not shown as true illustrations. It is at once apparent that the remote valve 122 has in total six settings as previously identified by the abbreviations N, FI, F1, F2, R1, R2, and the valves is shown in the neutral setting.

NEUTRAL SETTING

In the neutral setting of the remote valve 122, the four oil lines F1, F2, R1 and R2 are connected in common to, and are at the pressure of, the lube oil pressure line L. The neutral line N and the main pressure line M are interconnected, and a flow check valve 182 in the oil line N unseats in a direction such that the line N immediately communicates, and sustains main line pressure in, an hydraulic cylinder 184 mechanically connected to the transmission valve N0. The latter valve shifts against the resistance of a return spring and takes the neutral setting as shown. The valve N0 maintains an open connection between an oil line 186 carrying main line pressure and two circuit branches 188 and 190 which split the flow and lead respectively to the decelerator cylinder 52, which reacts by extending, and to the automatic brake control cylinder 90, which reacts by foreshortening. The result is that the cylinder 90 pulls the pull rod 92 so as to set the vehicle brakes, and the decelerator cylinder 52 pushes into the position shown in FIGURE 3 so as to rock the front link of the parallelogram linkage 40 and set the engine in idling without delay.

Movement of the valve 122 from neutral, or into and through neutral, into any one of the other five settings causes the hydraulic cylinder 184 and the series-connected flow check valve 182 to be connected to drain into the lube pressure line L. However, the flow check valve 182 checks by seating to offer high resistance to drainage of the cylinder 184, and the valve N0 reaches the out-of-neutral setting 0 only after a set delay, e.g., 2 seconds to 2½ seconds. Following such delay, the valve N0 takes the 0 setting so as to communicate main line pressure to the other two transmission valves in series. The transmission valve N0, moreover, drains the decelerator cylinder 52 and the automatic brake control cylinder 90 by connecting the two circuit branches 188 and 190 to the lube oil pressure after the set delay, thus releasing the vehicle brakes and restoring the engine to the running speed at which it was immediately previously operating.

FAST IDLE

This setting of the valve 122 is the same as the neutral setting, except that the valve 122 closes main pressure line M, and the neutral line N which was connected to the main line is reconnected to the lube pressure line L, enabling the valve N0 to take the out-of-neutral position 0. After the set delay referred to, the decelerator is inactivated and the fuel automatic brake control is inactivated. Thus, the fuel pump 30 will respond to the existing position of the speed control handle 34, for running accessories or auxiliaries from the PT0 connection, not shown, at the set speed desired.

LOW RANGE FORWARD DRIVE

In this setting, the valve 122 makes the operative connections indicated at F1 within the remote valve housing 124, interconnecting the main pressure line M and the oil line F1 which fills an hydraulic cylinder 192. The cylinder 192, which is connected to the transmission valve F2F1, operates the valve F2F1 into the F1 position, connecting the service line 160 and the F1 side of the forward drive clutch pack 168 to main line pressure, and connecting the F2 side and the service line 162 therefrom to the lube pressure prevailing at point L. The input to the final drive of the vehicle is therefore through the appropriate clutch and gearing affording the low range, forward drive speed.

LOW-RANGE REAR DRIVE

This setting of the remote valve 122 is indicated at R1 within the housing 124. Main line pressure is directed by the valve 122 through the oil line R1 into a cylinder 194 which operates the transmission valve R1R2 into one of two reverse positions. Main line pressure is directed by the valve R1R2 through the service line 166 into the R1 side of the reverse drive clutch pack 170, and the service line 164 drains the R2 side through the valve R1R2 into the lube pressure line connected to the point L. The input to the final drive is therefore through the appropriate clutch and gearing affording low range reverse drive speed.

HIGH RANGE DRIVES

The high range forward drive setting of the valve 122 makes the operative connections indicated at F2 and the high range rear drive setting makes the operative connections indicated at R2 within the housing 124. The respective side F2 of the clutch pack 168 or the side R2 of the other clutch pack 170 is pressurized at main line pressure by the appropriate transmission valve and the input to the final drive will be in the high range, either high forward drive or high reverse drive as selected.

From the foregoing, it is apparent that transfer of the valve lever 126 through the gate portion 148 in either direction between the slots 144 and 146, and also movement of the lever from the fast idle position indicated by the broken lines 126b into the solid line position shown in FIGURE 7 result in the same thing. Movement into or through the neutral setting always produces the result in the desired way of engaging the vehicle brakes and slowing the engine to idling. The only difference is that when the lever 126 is in the fast idle position indicated by the broken lines 126b, the vehicle is not being driven and so the application of the brakes has no noticeable effect. However, when the vehicle is in motion at this time, the application of the brakes is at once apparent to slow the transmission output and vehicle tracks, and, moreover, the effective drive is declutched without delay, all because of the instantaneous setting of the valve N0 into the neutral (N) position. That is to say, main line pressure is blocked from all components except for application, without delay, of such pressure through the valve N0 and branch circuits 188 and 190 to the decelerator cylinder 52 and the automatic brake cylinder 90.

My invention thus provides a novel method of effecting a low-shock change between rear and forward progress of a transmission driven vehicle, wherein the transmission is controlled by a forward-reverse drive control so that, when being reversed, the transmission neutralizes without delay and goes into the opposite or reverse drive setting after a set delay, and wherein the vehicle is of a type having an idlable engine normally in a drive speed condition and connected to the input of the transmission, a ground engaging brakable means connected in the output of the transmission so as to be variably coupled to the engine for changing speed and direction of the vehicle, and transmission forward-reverse drive control means consisting of a remote valve in a remote valve housing and moveable through a neutral setting when being shifted between rear and forward drive positions. My method comprises the steps of automatically slowing the engine by enforced idling and simultaneously slowing the vehicle by enforced braking without delay upon disengagement or neutralizing of the transmission, and automatically releasing the brakes and restoring the engine to a speed above idling as soon as the transmission reengages. These steps obviously can be performed by other automatic means not necessarily the same as the deceleration and automatic braking cylinders 52 and 90 constituting the present slowdown means, or not necessarily the same as the transmission valve N0 constituting presently a neutral responsive, second means connected to operate the slow down means in neutral and sensitive to movement of the remote valve, transmission drive control means whereby the second means is restored, from neutral, to a drive setting when the control means passes through neutral and moves in either direction into a drive position, or not necessarily the same as the flow check valve 182 constituting the present means for delaying restoration of the second means to a drive setting for a sufficient time period for the engine to be idling and the vehicle to be stopped.

What is claimed is:

1. For use in a tractor vehicle having a transmission conditionable to provide rear and forward drive conditions, and further having ground engaging brakable means by which the tractor is steerable by driving and which has friction engageable steering means including pivot brakes, the combination including:

actuating members for said friction engageable steering means including the pivot brakes;

a steering-means-operating linkage effective to apply one pivot brake upon full actuation of one member;

similar operating linkage between the other pivot brake and another member;

a third member comprising transmission control means movable through a neutral setting when being shifted either way between rear and forward drive conditions; and means operative in response to such movement of the control means into or through the neutral setting to apply both brakes.

2. The invention of claim 1, wherein the responsive means is characterized by a third operating linkage;

a fourth member; and a fourth operating linkage to apply both brakes upon actuation of the fourth member.

3. The invention of claim 2, wherein said linkages are pressure-operated linkages, which linkages are characterized by hydraulic mechanism, and a plurality of which linkages include at least one power cylinder therein.

4. The invention of claim 1, for use in the vehicle as described and having an engine provided with a fuel system and running normally at a drive speed, wherein:

the responsive means is a combined means which, when effectively operating the brakes to slow the vehicle to a stop, is simultaneously effective to slow the engine to idling.

5. The invention of claim 4, characterized whereby the pivot brakes constitute the vehicle braking system, and said responsive means includes:

power means which has means for connection to the engine fuel system and which when operated causes an idle fuel setting;

power means which has means of connection to the braking system and which when operated causes the brakes to have an engaged setting; and operating means (N0) connected to both power *means* for simultaneously operating or inactivating same.

6. The invention of claim 5 said power means being fluid operable by a common valve;

said operating means comprising a valve common to both power means and having valve shifting means controlling same, the valve shifting controlling means being connected in the output of the transmission control means and responsive to the neutral and drive settings of the latter.

7. The invention of claim 6, said common valve having a neutral position which, when thereby, operates the power means and is restorable by the valve shifting controlling means from neutral into a drive position.

8. The invention of claim 7, the output of said transmission control means including means therein affording shift of the common valve into neutral position by the valve shifting controlling means without delay, but delaying restoration of the valve into a drive position by the valve shifting controlling means so that the power means are inactivated only after a set delay.

9. The invention of claim 8, said valve further being common to rear and forward drive power means in said conditionable transmission for operating same, said valve affording, when being shifted into neutral position of the valve, neutralization of the transmission without delay, and effecting restoration of drive through the transmission only after the set delay required for the valve to be shifted by the valve shifting controlling means into the drive position.

10. The invention of claim 9, the power means having the connection to the engine fuel system comprising a normally foreshortened cylinder (52) operable by the common valve, a linkage which is included in the fuel system to change the setting and which, when the cylinder expands, is engaged thereby to set the engine in idling;

an operator operated handle joined to the linkage; and a lost motion connection in said joint affording displacement of the linkage by said cylinder without disturbing the operator operated handle.

11. The invention of claim 9, the power means having the connection to the engine fuel system comprising a normally foreshortened decelerator cylinder;

the power means having the connection to the brakes comprising a normally extended, automatic braking control cylinder (90);

a fourth one of said actuating members comprising brake pedal; and a linkage which is included in the braking system of the vehicle and which is connected by said braking cylinder to the brake pedal, said brake pedal being pivotable from an unpivoted position so as to move the linkage and engage the vehicle brakes;

said braking cylinder responding to shift of the common valve into the neutral position by operatively foreshortening itself in the connection between the pedal and the linkage, so as to engage the brakes without disturbing the brake pedal when in the unpivoted position.

12. The invention of claim 11, said transmission control means having a fluid output and comprising:

a valve housing connected to the valve shifting controlling means;

a valve slidably mounted in the housing for selective reciprocation and rotation therein;

a reciprocation and rotation causing valve lever connected to the valve and tiltable from a central reference plane into two other planes, all such planes passing through the axis of the valve;

said valve lever being pivotable to plural positions in each of said planes, including a neutral position and a fast idle position both in the central reference plane; and means for locking the valve lever in its central reference plane.

13. The invention of claim 12, further including:

a gate plate slotted to receive said valve lever, and defining therefor spaced apart slots each in a different one of said two other planes, and a gate in the plate passing through the central reference plane and interconnecting the spaced apart slots, said gate having portions accommodating the aforesaid neutral and fast idle positions of the valve lever in its central reference plane, and being relieved so as to accommodate overtravel of the valve lever in the central reference plane into a start position.

14. The invention of claim 9, further including:

a starter switch fixed in the path of movement of the valve lever so that, upon overtravel of the valve lever into the start position, the lever will close the starter switch.

15. The invention of claim 14, the connection of said valve lever to the valve comprising a pin joint at a point intermediate the ends of the lever, and a rod located in a plane perpendicular to said axis of the valve and being spaced apart from said axis;

said valve lever having a slot in the lower end receiving said fixed rod to form a pin and slot connection so that the lever can be pivoted about its lower end to pass into or through said perpendicular plane.

16. The invention of claim 15, said valve lever when pivoting in the respective planes of the two other slots having positions corresponding to settings of a range selector valve.

17. The invention of claim 16, further including:

biasing means acting against opposite sides of the lower end of the valve lever and reaching a balanced position by forcing the lever in the gate to the point where the lever occupies its central reference plane.

18. In a vehicle having a transmission conditionable to provide power transmitting drive paths, said vehicle having an engine normally in a drive speed condition:

a transmission control movable through a neutral setting when being shifted between rear and forward drive positions;

slowdown means to slow the engine by enforced idling and simultaneously to slow the vehicle by enforced braking;

neutral responsive second means connected to operate the slowdown means in neutral and sensitive to movement of the control means whereby the second means is restored, from neutral, to a drive setting when the control passes through neutral and moves in either direction into a drive position; and means for delaying restoration of the second means to a drive setting for a sufficient time period for the engine to be idling and the vehicle to be stopped.

19. The invention of claim 18, said neutral responsive second means, when restored to a drive setting, effective to inactivate the slowdown means and having a connection to the conditionable transmission to effect the restoration of drive, whereby speed and the unbraked transmission of power resume.

20. The invention of claim 19, said transmission control comprising a remote valve maintained at line pressure;

said second means comprising a pressure shiftable valve, the two said valves having an interconnecting line for applying and exhausting line pressure to the pressure shiftable valve to change the setting of the second means; and a flow-check valve connected in said line with directions of seating and unseating such that the pressure shiftable valve is forced into the neutral setting without delay when the line flow is in one direction and is restored to a drive setting only after a set delay when the line flow is in the opposite direction.

21. The invention of claim 19, said engine being characterized by having a fuel control system and a handle for setting same in varying speed conditions;

said slowdown means having a connection to, and being effective to change the setting of, the fuel control system without disturbing the handle; and means (54) separate to the slowdown means having a deceleration connection to, and effective for independently changing the setting of, the fuel control system without disturbing the handle.

22. The invention of claim 19, further including:

means (78) having a braking connection to, and effective for enforced braking of, the vehicle independently of the slowdown means.

23. In combination with a braking means, an engine deceleration means, and the friction means of a forward and rear drive vehicle, said friction means including at least one opposite drive clutch or brake which remains inactive to reverse the drive until a companion operative clutch or brake is declutched, a shock reducing control system to facilitate drive reversal, comprising the combination of:

controlled power means effective to cause activation or not of the engine deceleration means and braking means and fraction means;

a control which passes through neutral between opposed forward-reverse positions assumed thereby; and responsive means operatively connected with and responsive to the control passing from one position through neutral to an opposite position, said responsive means connected to the power means effective to automatically activate the braking and decelerating means without delay when the declutching occurs, and effective automatically after a set delay to inactivate the braking and decelerating means and activate the opposite drive clutch or brake.

24. Method of effecting a low shock change either way between rear and forward progress of a transmission driven vehicle, said vehicle having a transmission which is controlled by a forward-reverse drive control so that when being reversed, the transmission disengages without delay and re-engages in an opposite or reverse drive setting after a set delay, an idlable engine normally in a drive speed condition and connected to the input of the transmission, and a ground engaging brakable means connected in the output of the transmission so as to be variably coupled to the engine for changing speed and direction of the vehicle, said method comprising the steps of:

automatically slowing the engine by enforced idling and simultaneously slowing the vehicle by enforced braking, without delay upon disengagement of the transmission; and automatically releasing the brakes and restoring the engine to a speed above regular idling when the transmission re-engages after the set delay.

25. Method of effecting a low shock change either way between rear and forward progress of a transmission driven vehicle, said vehicle having a transmission which is controlled by a forward-reverse drive control so that the transmission when in either setting can be disengaged and re-engaged in the opposite setting, an idlable engine normally in a drive speed condition and connected to the input of the transmission, and traction means which has disengageable vehicle brakes connected thereto and which is connected in the output of the transmission so as to be variably coupled to the engine for changing speed and direction of the vehicle, said method comprising the steps of:

automatically slowing the vehicle by enforced braking, and simultaneously slowing the engine by enforced idling and disengaging the setting of the transmission, all without delay; and after an automatic period of delay, disengaging the brakes and re-engaging the transmission in an opposite setting, and simultaneously restoring the engine to a speed above regular idling.

*26. For use in a tractor vehicle having a transmission with friction means therein to effect rear and forward drive in the transmission, and further having ground engaging brakeable means by which the vehicle is steerable by driving and which has friction engageable steering means including pivot brakes, said transmission friction means including at least one opposite drive clutch or brake which remains inactive to reverse the drive until a companion operative clutch or brake is declutched, the combination including:*

*actuating members for said friction engageable steering means including the pivot brakes;*

*a steering-means-operating linkage effective to apply one pivot brake upon full actuation of one member;*

*similar operating linkage between the other pivot brake and another member;*

*a third member comprising transmission control means movable through a neutral setting when being shifted either way between opposed, rear and forward shifted, drive positions assumed thereby;*

*controlled power means effective to cause activation or not of both pivot brakes and the friction means, the declutching of the friction means being rapid when so inactivated; and*

*responsive means operatively connected with and responsive to the transmission control means being shifted to an opposite position, said responsive means connected to the power means effective to automatically progressively activate both pivot brakes without delay when the rapid declutching occurs, and effecting inactivation of both pivot brakes and activation of the opposite drive clutch or brake progressively.*

*27. The invention of claim 26:*

*said responsive means including delayed automatic control means operative, upon an operating characteristic in the responsive means being reached after an enforced delay, to cause the responsive means automatically after delaying to effect the aforesaid inactivation of both pivot brakes and activation of the opposite drive clutch or brake progressively.*

References Cited

The following references, cited by the Examiner, are of record in the patented file of this patent or the original patent.

UNITED STATES PATENTS

| | | | |
|---|---|---|---|
| 2,176,897 | 10/1939 | Fodor | 192—4 R |
| 2,321,098 | 6/1943 | Morse | 192—4 R UX |
| 2,323,753 | 7/1943 | Jaeger et al. | 192—4 R |
| 2,421,206 | 5/1947 | Kylin et al. | 192—4 R |
| 2,475,997 | 7/1949 | Smith | 192—4 R |
| 2,613,773 | 10/1952 | Gilfillan | 192—4 R |
| 3,132,729 | 5/1964 | Garland | 192—4 R |
| 2,104,608 | 1/1938 | Cox et al. | 192—.09 X |
| 2,469,743 | 5/1949 | Newton | 192—4 |
| 2,791,918 | 5/1957 | Frellsen | 180—6.7 X |
| 2,880,832 | 4/1959 | Apel | 192—.09 X |
| 2,961,078 | 11/1960 | Shannon et al. | 192—4 R |
| 3,205,983 | 9/1965 | Chivsa | 192—.09 |

BENJAMIN W. WYCHE, Primary Examiner

U.S. Cl. X.R.

192—.094, 4 C, 3 R, 13 R